(12) United States Patent
Miller et al.

(10) Patent No.: US 8,690,982 B1
(45) Date of Patent: *Apr. 8, 2014

(54) METHOD AND SYSTEM FOR AGRICULTURE FERTIGATION

(71) Applicants: John C. Miller, Fresno, CA (US); Deborah L. Miller, Fresno, CA (US)

(72) Inventors: John C. Miller, Fresno, CA (US); Deborah L. Miller, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/815,298

(22) Filed: Feb. 19, 2013

Related U.S. Application Data

(63) Continuation-in-part of application No. 13/136,032, filed on Jul. 21, 2011, now Pat. No. 8,568,506, which is a continuation-in-part of application No. 12/283,448, filed on Sep. 12, 2008, now abandoned.

(60) Provisional application No. 61/056,151, filed on May 27, 2008.

(51) Int. Cl.
*C05B 7/00* (2006.01)
*C05B 17/00* (2006.01)
*C05C 9/00* (2006.01)
*B01J 10/00* (2006.01)
*B01J 14/00* (2006.01)

(52) U.S. Cl.
USPC ............ 71/29; 71/33; 71/34; 71/36; 239/727; 422/129

(58) Field of Classification Search
USPC ............. 239/727; 422/129; 71/28, 29, 30, 34, 71/36, 58, 63, 33
See application file for complete search history.

(56) References Cited

U.S. PATENT DOCUMENTS 2,163,065 A * 6/1939 Rosenstein .................... 71/1
2,969,280 A * 1/1961 Peck ............................. 71/41
3,888,652 A * 6/1975 Yie et al. ...................... 71/61

* cited by examiner

*Primary Examiner* — Wayne Langel
(74) *Attorney, Agent, or Firm* — Joan I. Norek; The Law Office of Joan I Norek (57) ABSTRACT

An agricultural fertigation method includes the continuous introduction of concentrated raw materials into a high-dilution irrigation-water environment whereby the stream of flowing irrigation water dampens the resultant dissolution and reaction exotherms. A system wherein raw materials are efficiently continuously fed to the irrigation system main line or a side-arm reactor efficiently implements the method.

21 Claims, 4 Drawing Sheets

METHOD AND SYSTEM FOR AGRICULTURE FERTIGATION

This application is a continuation in part of co-pending application Ser. No. 13/136,032, filed on Jul. 21, 2011, which is a continuation in part of application Ser. No. 12/283,448, filed on Sep. 12, 2008, claiming the domestic priority benefit of application No. 61/056,151 filed on May 27, 2008, inventors Miller et al.

BACKGROUND OF THE INVENTION

The present invention relates to methods for adding fertilizer nutrients, particularly phosphorus, to agricultural irrigation systems, including particularly agricultural micro-irrigation and sprinkler systems.

The agriculture industry adds fertilizers to the plant environs, such as the soil, to enhance crop growth and subsequent yields. Commercial fertilizers are usually selected of a variety of formulations depending on the crop and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. Nitrogen, phosphorus and potassium are the basic plant nutrients or macronutrients that are taken up and utilized by the growing crops, and that are provided by the addition of fertilizers (NPK fertilizers).

A fertilizer, as that term is used herein and as generally understood, refers to the nutrient-containing materials used to deliver fertilizer nutrients to a crop. Conventional fertilizers typically will contain materials that are extraneous to the crop's nutrient-uptake ("nutrient-extraneous materials") but which, for practical and/or other reasons, are necessary to the delivery of the nutrients. The process of delivering fertilizer nutrients to crops is referred to as fertilization.

The fertilization method of adding fertilizers to the water being used to irrigate the crops is called "fertigation", reflecting this combination of irrigation and fertilization. Fertigation reduces the labor expended in the addition of fertilizers.

To conserve water, which is decreasing in availability and increasing in cost, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation systems contain devices called emitters, micro-sprinklers or other such devices that provide the precise amounts of water directly to the desired soil site, namely the soil holding the roots of the plant or crop being irrigated. Upon conversion to micro-irrigation systems, farmers began adding fertilizers through them.

Micro-irrigation systems, unfortunately, are sensitive to water quality and the inclusion of fertilizers and other additives. The sensitivity of micro-irrigation systems to water quality and additives stems from the refinement of the micro components in a micro-irrigation system. These emitters, micro-sprinklers or other micro devices deliver the desired precise amounts of water so long as they do not plug or foul. Plugging occurs when deposits, from any source, build up inside these devices. The smallest particle or foreign material can cause fouling of these devices because these devices have very tiny orifices and/or a long tortuous narrow passageway that provide the requisite pressure for delivery of precise amounts of water in a uniform manner to each plant in the crop being irrigated. Water quality and the inclusion of fertilizers can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers can form insoluble salts and/or cause particulate formation when added to the water. Macro-irrigation systems mainly tolerate these conditions, while micro-irrigation systems are extremely intolerant.

In more detail, the addition of fertilizer formulations to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers.

Plugging results in uneven distribution of water and nutrients to the crop being irrigated. In some cases, complete shut-down of the irrigation system occurs. Therefore problem-free use of additives such as fertilizers in micro-irrigation systems is normally seen only in irrigation systems that use relatively pure water sources.

The conventional agricultural practice is to make intermittent or periodic applications of fertilizers. Such intermittent additions might be a single addition, or a plurality of spaced-apart or set-apart additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block. Fertigation reduces equipment, fuel and labor costs in comparison to mechanical delivery of fertilizers to the crop, and thus fertigation achieves a significant overall cost savings.

The cost of commercial fertilizer formulations is, however, itself significant, and commercially viable fertilizer formulations (formulations sufficiently inexpensive for bulk agricultural use) typically include, as mentioned above, nutrient-extraneous materials which do not contribute to plant nutrition, and can even be undesirable components.

The term "micro-irrigation" as used herein and in the claims refers to microsprinkers, drip, and subsurface drip systems.

SUMMARY OF THE INVENTION

The present invention provides a method and/or system for fertigation wherein a phosphorus-nutrient feedstock (concentrated phosphoric acid, and a base if needed for pH adjustment) is charged to an active irrigation system continuously, or substantially continuously, at very low levels, during the entire time, or substantially the entire time, that irrigation water is sufficiently flowing through the irrigation system during a prolonged term via a system that provides a high-dilution environment in the feedstock-component intermixing zone. The present method provides on-site fertilizer formulation from the feedstock as that feedstock is charged to the irrigation system continuously, or substantially continuously, at very low levels, during the entire time, or substantially the entire time, that irrigation water is sufficiently flowing through the irrigation system, for a prolonged term ("prolonged-termed continuous charge" or "prolonged-termed continuous fertigation") whereby a phosphorus-nutrient feedstock is formulated that has a higher phosphorus-nutrient content, has low or minimal nutrient-extraneous material and is drastically less costly because a commodity raw material is used, which are advantages that are not available from conventional commercial fertilizers or practices. The feedstock is comprised of phosphoric acid and, if needed to raise the pH, at least one base that intermix with each other when a base is included, and intermix with water, as the feedstock is charged to the irrigation system. In preferred embodiments, the system of the present invention is automatic and subject to variation of the amount and type of raw materials forming the feedstock as desired.

DETAILED DESCRIPTION OF THE INVENTION

Prolonged Term:

By prolonged term is meant herein throughout a crop cycle or over one or more intervals or terms during a crop cycle, each comprising at least multiple consecutive or successive irrigations, and preferably each comprising or encompassing at least a one month time period or a time period comprising ten percent of the respective crop cycle, and more preferably at least a two month time period or a time period comprising twenty-five percent of the respective crop cycle.

On-Site, In-Situ Fertilizer Formulation

The method and/or system of the present invention, namely the method and/or system for fertigation by charging a phosphorus-nutrient feedstock, rather than a commercial fertilizer, to the irrigation system, is drastically less costly because a commodity raw material is used, which is an advantage that is not available from conventional commercial fertilizers or practices. The feedstock is comprised of phosphoric acid and, if needed, a base, that intermix as the feedstock is charged to the irrigation system. At the preferred concentrated levels of phosphoric acid, namely concentrated phosphoric acid (a 50 to 85 weight percent aqueous solution of phosphoric acid, and more preferably 65 to 85 wt. percent same basis), the feedstock is a 0-36.2-0 to 0-61.6-0 NPK fertilizer. Conventional agricultural practices (slug-feeding) would never add concentrated phosphoric acid because the resultant high acidity would damage the irrigation system. The typical sources of phosphorus used in conventional agricultural fertigation are phosphate fertilizers, which contain one or more soluble phosphates (typically sodium, potassium and ammonium phosphates) although the phosphate anion can cause precipitation and fouling problems. The present invention's prolonged-termed continuous charge of a phosphorus-nutrient feedstock to the irrigation system at very low levels also provides a uniform, consistent level of phosphorus-nutrient availability throughout a crop cycle, in comparison to conventional fertigation techniques, as discussed below.

As discussed above, the phosphorus-nutrient feedstock used in the present invention is a combination of phosphoric acid, and if needed to adjust the pH, a base. The preferred base is selected from the group consisting of concentrated urea, concentrated potassium hydroxide, concentrated ammonium hydroxide, ammonia (ammonia gas) and combinations thereof. In the practice of the method of the present method, ammonia gas (ammonia as a 95 to 100 wt. percent gas) can be dissolved in water on-site to produce ammonium hydroxide prior to charging it to irrigation water, or it can be charged to the irrigation water as a gas (whereby ammonium hydroxide is formed within the irrigation water of the irrigation system). The present invention does not exclude the concomitant addition of other materials if desired, including but not limited to one or more other fertilizers and the like.

Phosphoric Acid

A concentrated mineral acid such as phosphoric acid is a very corrosive material that necessitates special equipment and safety precautions, and the addition of this acid under conventional practices creates a risk of (a) corrosion of the metal components of the irrigation system and (b) embrittlement of, and damage to, the sensitive plastic irrigation-system components (emitters and the like) that deliver regulated amounts of water to each plant.

Conventional Fertigation Methods and the Plugging-Potential Drawback

In conventional fertigation methods, the slug feeding of various fertilizer formulations can cause substantial plugging of the irrigation system. This type of plugging occurs when impurities contained in the irrigation water interact with the fertilizer being slug fed. The solubility of one or more components of fertilizer and one or more of the impurities of the irrigation water is exceeded and one or more insoluble salts are formed and precipitate. This precipitate then plugs the various parts of the irrigation system, particularly the emitters and/or micro-sprinklers.

In more detail, most naturally-occurring waters contain dissolved minerals that can lead to plugging in micro-irrigation systems. Irrigation water contain constituents such as calcium, magnesium, alkalinity, iron, manganese, sulfates, and sulfide can precipitate to clog emitter flow, causing plugging. Calcium or magnesium concentrations exceeding 2-3 meq/liter (100-150 ppm as $CaCO_3$) can cause precipitates to form. The Solubility Chart below provides an overview of inorganic anion/cation incompatibilities, that is, anions and cations that, when both are present, lead to insoluble inorganic salt formation that can cause plugging in micro-irrigation systems.

CHART 1

Solubility Chart For Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | S | $H_2O$ | S | $CO_2$ | S | $H_2S$ | S |

CHART 1-continued

Solubility Chart For Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company 1977.

Conventional Fertigation Methods and the Unbalanced Nutrient Availability Drawback As discussed above, the conventional method of fertilizer addition involves adding the fertilizer about once or twice a growing season or crop cycle because of the logistics and labor that are required. When the fertilizer is accordingly slug fed to the field, it is typically fed at a very high rate over a short period of time, such as six to seven hours, whereby a high concentration of fertilizer is added to the root zone of the crop. This high concentration of fertilizer is greater than the plant can absorb, and therefore it is not completely absorbed (which is why a portion of the fertilizer itself is considered one of the "nutrient-extraneous materials"). Some of the residual fertilizer, which typically is a high fertilizer residual, interacts with the soil. These fertilizer-soil interactions normally result in the formation of insoluble inorganic salts, with a concomitant and substantially irreversible loss of available fertilizer. Further, each subsequent non-fertigation irrigation drives or washes available residual fertilizer away from the wetted root zone core towards the perimeter of the wetted zone, mechanically diminishing its availability to the plant. Eventually, the fertilizer concentration gradient which is created results in very little fertilizer being available within the wetted root zone. The level of available residual fertilizer in the wetted root zone will typically drop to essentially zero for a time period ahead of the next fertigation. For these reasons, conventional fertigation practices lead to huge swings in the amount of fertilizer that is available to the plant over time. These swings in available fertilizer in turn lead to costly compensations in the form of increased fertilizer feeds. In other words, the amount of fertilizer that is considered required is increased because a significant portion of the residual fertilizer becomes unavailable to the plant.

The Basics of the Present Fertigation Method and System

The phosphorus-nutrient feedstock is charged to an irrigation system by concomitantly feeding its component(s) (raw material(s)) to a water stream (preferably a stream of irrigation water) either (1) flowing through a mixing chamber that discharges to a main line of an irrigation system downstream of any irrigation-system filters and upstream of the delivery points of the irrigation system or (2) flowing through a main line of an irrigation system (that is, directly charging to a main line of an irrigation system) downstream of any irrigation-system filters and upstream of the delivery points of the irrigation system. The intermixing of component(s) (with each other and/or with the irrigation water) therefore is initiated either in a mixing chamber upstream of the irrigation system's main line or within the main line itself.

The present method and system of the present invention preferably employ an automated feed system which simultaneously feeds or charges the raw material(s) to the mixing chamber or main line at a pre-selected or pre-determined rate. Such an automated feed system therefore charges a phosphorus-nutrient feedstock of a pre-selected or pre-determined composition at a pre-selected or pre-determined rate. The automatic feeding of the phosphorus-nutrient feedstock at a pre-selected or pre-determined rate is particularly important when it is desirable to feed the feedstock at a rate relative to the irrigation-water flow rate, so as to automatically provide and maintain a pre-selected or pre-determined concentration of the (or each) phosphorus-nutrient raw material in the irrigation water throughout the fertigation period, including when the irrigation water flow rate varies from one set to the next. Such an automated feed system would be inactive or idle when there is no irrigation water flow in the irrigation line served by the automated feed system. That automated feed system may be, and in certain embodiments is preferably, automatically activated or triggered upon the commencement of water flow in the irrigation line, and may be, and in certain embodiments is preferably, automatically deactivated or halted when the flow of irrigation water ceases.

The charge of the phosphorus-nutrient feedstock to the irrigation water is at a very low level feed so as to restrict or confine phosphorus-nutrient-feedstock concentration in the irrigation water to very low levels at all times. The charge of the phosphorus-nutrient feedstock to the irrigation water is prolonged-termed continuous. By a prolonged-termed continuous charge of phosphorus-nutrient feedstock (or continuously charging phosphorus-nutrient feedstock for a prolonged term) is meant herein that the charge is continuous when irrigation water is sufficiently flowing to dampen the exotherm that results from the charge, or in other words, substantially continuous throughout the irrigation cycles or continuous when the irrigation system is active, for a term of at least multiple consecutive or successive irrigations up to a term of throughout a crop cycle. In more detail, when an irrigation system is idled, water usually drains out and the system becomes mainly filled with air. Upon reactivation, there is a time delay between the start of water flowing into the irrigation system and the point of time at which the system reaches its full or normal operating pressure (from about 10 to 150 psi depending on the system). The prolonged-termed continuous charge of phosphorus-nutrient feedstock ceases when the shut down (the idling) of the irrigation system initiates (and the water pressure falls below full or normal operating pressure for the given system) and does not recommence on the subsequent consecutive or successive irrigation day during the prolonged term until at least a preponderance of the irrigation system is refilled with water, at which point the system is typically approaching, but might not yet be at, its full or normal operating pressure. The water-flow characteristics required to dampen the exotherm can be calculated using simple thermodynamics for any given irrigation system. An alternative determinant is ninety percent of full or normal operating pressure, or in other words, by a prolonged-termed continuous charge of phosphorus-nutrient feedstock is meant herein that the charge is continuous (although it can vary as to selection of raw materials) for a term of at least multiple consecutive or successive irrigations up to a term of throughout a crop cycle when irrigation water is flowing at least at ninety percent of full or normal operating pressure.

The Present Fertigation Method and Alleviation of the Plugging-Potential Drawback Plugging of the irrigation system due to the additional loading of cations and anions, leading to the formation and precipitation of insoluble salts, is eliminated by the method and system of the present invention because the charge of the phosphorus-nutrient feedstock continuously at very low levels keeps such precipitates from forming. In other words, the charge of phosphorus-nutrient feedstock in the method and system of the present invention is at a rate that provides a component concentration in the irrigation water below the concentration which would trigger precipitate formation. Solubilities are not exceeded even despite low irrigation water quality.

The Present Fertigation Method and Alleviation of the Unbalanced Nutrient Availability Drawback In contrast to huge swings in available fertilizer when the fertilizer is slug fed about once or twice during a crop cycle, in the present method the phosphorus-nutrient feedstock is added continuously at a very low level. Therefore the level of available fertilizer in the wetted root zone will remain substantially uniform over the entire crop cycle when the prolonged term is throughout a crop cycle. There will be no swings in the amount of fertilizer that is available to the plant over time. There will be no lost-fertilizer compensations in the form of increased fertilizer feeds. The amount of fertilizer that is considered required is not increased because, in that embodiment of the method and system of the present invention, essentially little or no fertilizer becomes unavailable to the plant. These advantages are diminished in degree, but not entirely lost, in comparison to slug feeding, when the prolonged term(s) are less than throughout a crop cycle.

Long-Felt Need

The present invention is believed to fulfill a long-standing and long-felt need of the agricultural industry and is expected to garner great commercial success attributable to such fulfillment. Further, as seen from the above, the raw material(s) of the phosphorus-nutrient feedstock includes a strong mineral acid, namely phosphoric acid, and this mineral acid preferably will be used in the present invention in concentrated form. Also possibly among the raw materials is one or more strong bases, namely urea, potassium hydroxide, ammonium hydroxide, ammonia (gas) and combinations thereof, and this or these preferably will be used in the present invention in concentrated form. This or these phosphorus-nutrient raw material(s) possess far too large of a heat of dissolution and heat of reaction (when intermixed) for use in conventional fertigation.

Figure 1:
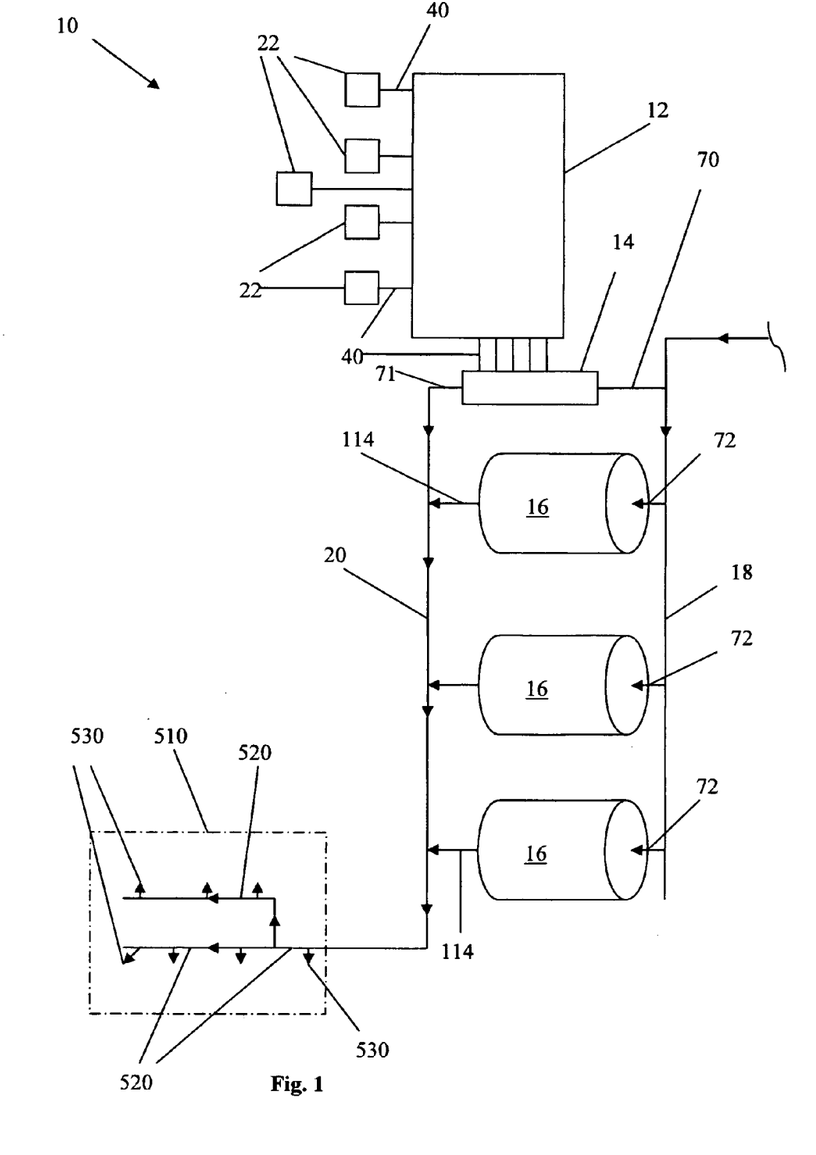
FIG. 1 is an at least partially diagrammatic view of a system of the present invention.
Figure 2:
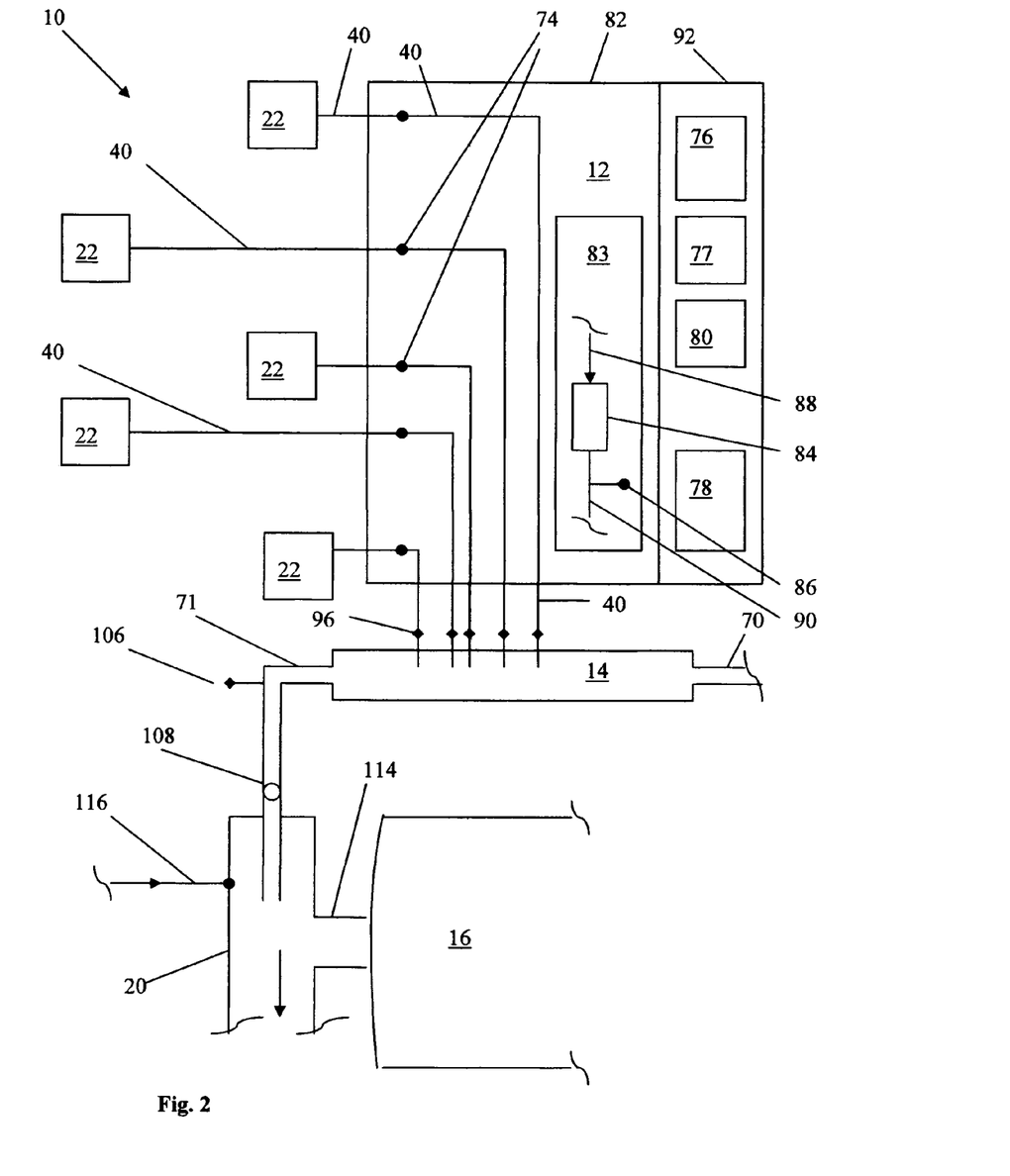
FIG. 2 is an at least partially diagrammatic view of a section of the system of FIG. 1.
Figure 3:
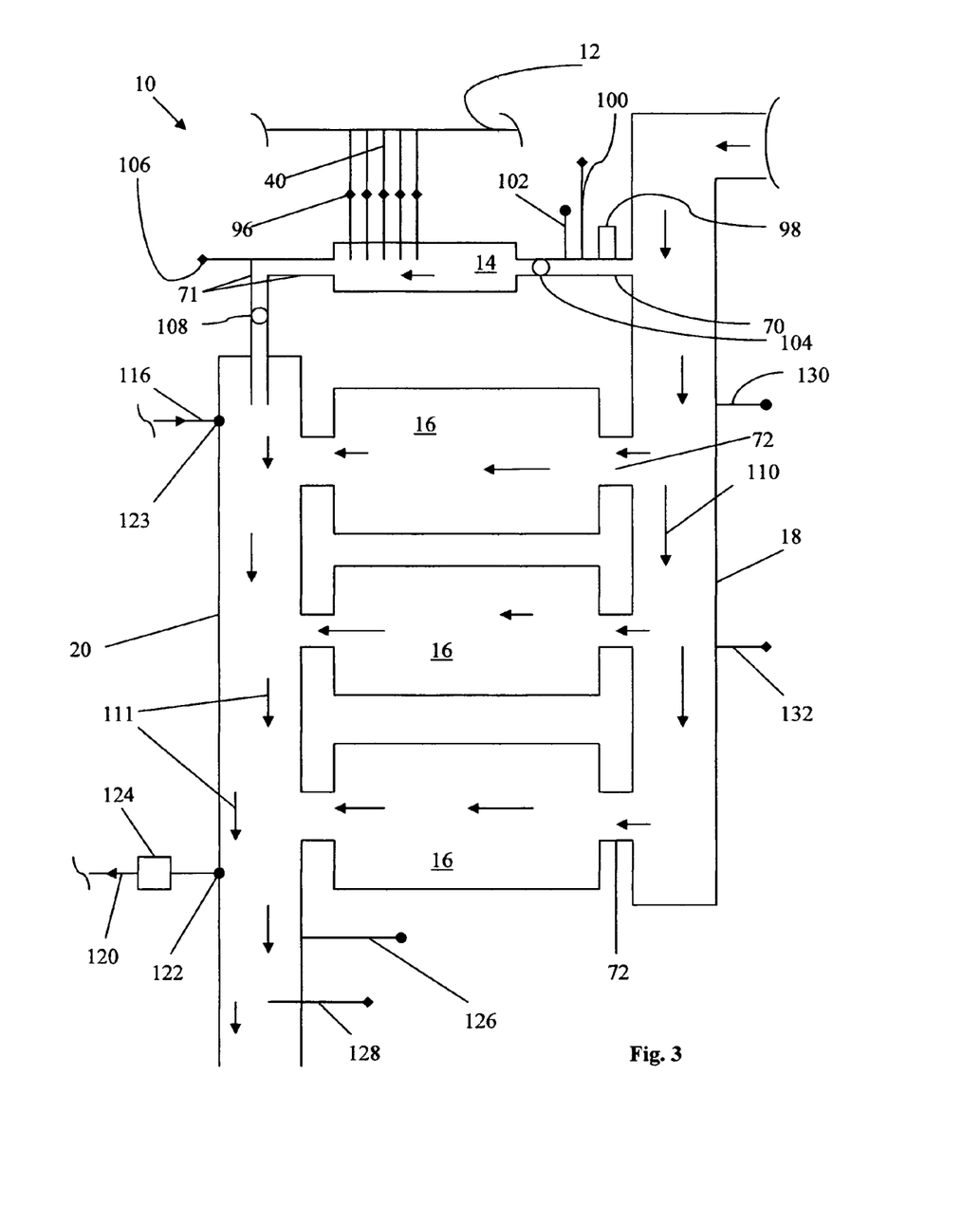
FIG. 3 is an at least partially diagrammatic view of a section of the system of FIG. 1.

The System of FIG. 1 to FIG. 3

Referring to FIG. 1 and, to the extent components are shown in FIG. 2 and FIG. 3, to FIG. 2 and FIG. 3 also, there is shown a system of the present invention designated by the general reference numeral 10. An agricultural irrigation system distributes irrigation water typically from a water source whether it be a well, surface water (such as water in a canal, reservoir, stream or the like), reclaimed or recycled water. A stream of irrigation water is pumped into a main line (irrigation system main line) and then is filtered. The system 10, as shown in FIG. 1, FIG. 2 and FIG. 3, is an embodiment of an extended system of the present invention because system 10 includes such filters and a segment of such a main line from a point upstream of the filters to a point downstream of the filters, and the addition of phosphorus-nutrient feedstock raw material(s) occurs between these two points.

As described below, a segment of a stream of irrigation water that is running between the irrigation-water source and the irrigation line(s) in the field(s) is within the system 10 wherein the irrigation water is first filtered and then treated with the feedstock of the present invention. The system 10 includes a control unit 12, optionally a plurality of filters, which here are shown as sand-media filters 16, an irrigation-water line, which here is shown as a pre-filter (and somewhat higher pressure) segment of an irrigation-water main line, or pre-filter main line 18, which feeds irrigation water (identified and discussed below) through each of the sand-media filters 16, and also through a mixing chamber 14, to a post-filter (and somewhat lower pressure) segment of the irrigation-water main line, or post-filter main line 20. (The post-filter main line 20 is a transport pipe that carries irrigation water to one or more agricultural fields, such as the agricultural field 510 shown in phantom, and obviously not to scale, in FIG. 1. One or more secondary transport pipes service a typical agricultural field, such as transport pipes 520 shown in FIG. 1. Devices for delivering the irrigation water at points in the field, shown as devices 530 in FIG. 1, can be overhead sprinklers or micro-devices (such as emitters or micro-sprinklers.) The feedstock raw material(s) are stored in separate storage containers 22 which may be conveniently disposed nearby the control unit 12 as shown. As shown, such storage containers or tanks 22 include one for the primary raw material, namely concentrated phosphoric acid. Three additional storage tanks 22 for other materials, such as concentrated urea, concentrated potassium hydroxide, concentrated ammonium hydroxide and/or ammonia (gas), or other materials to be added, including but not limited to extraneous fertilizers or other additives, are shown. (The storage tanks 22 are shown staggered for simplicity in showing each of the raw material feed lines 40.)

In other words, the system and method of the present invention requires at least one storage facility, namely the one for the phosphoric acid, because this raw material is always charged separately to the water stream. The system and method of the present invention does not exclude the feeding of other (which for practical reasons are preferably compatible) materials and the components required to separately feed such materials.

There is a raw-material feed line 40 between each of the raw-material tanks 22 and the mixing chamber 14. These raw-material feed lines 40 run through the interior of the control unit 12 (not shown in FIG. 1) to the mixing chamber 14. For each of the raw materials, and raw-material feed lines 40, there is an injection valve 96 along the raw-material feed line 40 just ahead of the point at which the feed line 40 enters the mixing chamber 14, none of which is shown in FIG. 1 for simplicity, and all of which are shown in FIG. 2 and FIG. 3.

Irrigation water flows to and through each of the sand-media filters 16 through filter feed lines 72. A stream of the irrigation water also flows from the pre-filter main line 18 to the mixing chamber 14 through a mixing-chamber feed line 70, except when the mixing-chamber feed line 70 is closed off. The water flows from the mixing chamber 14 and from each of the sand-media filters 16 discharge to the post-filter main line 20.

Referring now in particular to FIG. 2 (where the storage tanks 22 are again shown staggered for simplicity in showing each of the raw material feed lines 40), each of the raw-material feed lines 40 is equipped with a feed pump 74. Each of these feed pumps 74 is controlled by a flow controller 76 and a master controller 78. Each of these feed pumps 74 is in electrical communication with a flow controller 76 and the master controller 78 (the electrical connections are not shown) and injects or pumps in its respective raw material to its respective feed line 40 at the rate determined by the flow controller 76 and the master controller 78.

The control unit 12 is divided into two chambers, one of which is a lower chamber 82 which houses the feed pumps 74 and a portion of the raw material feed lines 40 downstream of the respective tanks 22 and upstream of the mixing chamber 14. The second chamber of the control unit 12 is an upper chamber 92 which houses the flow controller 76, the master controller 78 and an optional temperature controller 77.

Along each of the raw material feed lines 40 downstream of the respective feed pumps 74 and upstream of the mixing chamber 14 is, as mentioned above, an injection valve 96, each of which is preferably equipped with a backflow preventer (not shown). Along the mixing-chamber feed line 70 are, in the order of from upstream (closest to the pre-filter main line 18) to downstream (closest to the mixing chamber 14) an optional booster pump 98, a mixing-chamber feed-line flow meter 100, a mixing-chamber feed-line flow sensor 102 and a mixing-chamber feed-line shut-off valve 104. The line opposite the mixing-chamber feed line 70 is a mixing-chamber discharge line 71 that is open to the post-filter main line 20. Along the mixing-chamber discharge line 71, in the order of from upstream (closest to the mixing chamber 14) to downstream (closest to the post-filter main line 20), are an optional mixing-chamber discharge-line thermocouple 106 and a mixing-chamber discharge-line shut-off valve 108.

The pre-filter main line 18 is open to the mixing chamber 14 through the mixing-chamber feed line 70, and is open to each of the sand-media filters 16 through filter feed lines 72 or openings. Untreated irrigation water, that is, irrigation water that is not yet treated by the system of the present invention, which is shown by flow arrows and is designated as untreated irrigation water 110 in FIG. 3, flows through the pre-filter main line 18 and discharges to the mixing chamber 14 and the sand-media filters 16 through these respective lines.

As noted above, the mixing-chamber discharge line 71 is open to, and discharges to, the post-filter main line 20, which is best seen in FIG. 3. In addition, each of the sand-media filters 16 is open to, and discharges to, the post-filter main line 20 via filter discharge lines 114 or openings. The untreated irrigation water 110 of the pre-filter main line 18 thus flows to the post-filter main line 20 and therein receives the discharge from the mixing-chamber discharge line 71, becoming irrigation water that carries or has been treated with the phosphorus-nutrient feedstock of the present invention. Such treated irrigation water is shown by flow arrows and is designated as treated irrigation water 111 in FIG. 3 and elsewhere herein.

Along the post-filter main line 20, in the order of from upstream (closest to the mixing-chamber discharge line 71) to downstream (farthest from the mixing-chamber discharge line 71), are a post-filter main-line pressure gauge 126 and a post-filter main-line flow sensor 128.

Along the pre-filter main line 18, in the order of from upstream (closest to the mixing-chamber feed line 70) to downstream (farthest from the mixing-chamber feed line 70), are a pre-filter main-line pressure sensor 130 and a pre-filter main-line pressure gauge 132.

The storage tanks 22 can vary in size depending on the size and nutrient needs of the irrigation site they serve. Typical storage container sizes are between 300 and 6,500 gallons. The electrical connections between the feed pumps 74 along the raw-material feed lines 40 and the controlling flow controller 76 and master controller 78 each consist separately of an on/off power control (not shown) and a feedback loop (not shown) which controls the output of the respective feed pumps 74, and the construction and operation of such electrical connections are well within the skill of an ordinary person skilled in the art. The upper chamber 92 of the control unit 12, which houses the electrical controls, namely the flow controller 76, the temperature controller 77 and the master controller 78, is isolated from the lower chamber 82 (which houses the feed pumps 74) to avoid, or at least inhibit, corrosion of the electrical components of the electrical controls. The control unit 12 generally is preferably constructed of heavy gauge steel that is anodized to inhibit corrosion. It preferably is secured with a high security lock system (not shown) and is preferably anchored to the ground with several six foot deep spikes (not shown) to prevent tampering and/or theft of the equipment held within the control unit 12.

The flow controller 76 within the control unit 12, which is one of the controls over the feed pumps 74, is also in electrical connection (not shown) with the post-filter main-line flow sensor 128 along the post-filter main line 20. (The construction and operation of these electrical connections are well within the skill of an ordinary person skilled in the art.) The flow controller 76 proportionately varies the input of the raw materials through the respective feed pumps 74 based on the flow rate of the treated irrigation water 111 which is read by the post-filter main-line flow sensor 128 downstream of (beyond) the sand-media filters 16.

The temperature controller 77 within the control unit 12 is in electrical connection (not shown) with the mixing-chamber discharge-line thermocouple 106 along the mixing-chamber discharge-line 71. (The construction and operation of these electrical connections are well within the skill of an ordinary person skilled in the art.) The raw materials from the storage tanks 22 are routed through the respective raw material feed lines 40 and charged to the mixing chamber 14 as the phosphorus-nutrient feedstock of the present invention. The component(s) of the phosphorus-nutrient feedstock are intermixed with each other (when there is a plurality of components) and with a stream of untreated irrigation water 110 being fed into the mixing chamber 14 through the mixing-chamber feed line 70. Upon such intermixing, there is an exotherm. The exotherm is the reason the temperature of the phosphorus-nutrient feedstock and irrigation water mixture is preferably monitored by the mixing-chamber discharge-line thermocouple 106 as the phosphorus-nutrient feedstock exits the mixing chamber 14. If that temperature is undesirably high, for instance 40° C. or higher (higher than 39° C.), the temperature controller 77 sends a feedback signal to the master controller 78 and the master controller 78 shuts off the feed pumps 74 until a safe temperature is seen at the mixing-chamber discharge-line thermocouple 106, and this off/on sequence is repeated until a safe temperature, as seen at the mixing-chamber discharge-line thermocouple 106, is maintained.

The master controller 78 automatically turns the system 10 on. The master controller 78 is electrically connected (not shown) both to the pre-filter main-line pressure sensor 130 and to the mixing-chamber feed-line flow sensor 102. (The construction and operation of these electrical connections are well within the skill of an ordinary person skilled in the art.) When a minimum pressure (typically 15 psi) is seen at the pre-filter main-line pressure sensor 130 and a minimum flow of water (typically twenty gallons per minute) is seen at the mixing-chamber feed-line flow sensor 102, the master controller 78 actuates the feed pumps 74 and injection valves 96 and any other component of the system 10 which facilitate the treatment of the untreated irrigation water that are then in an inactive state. Upon such actuation, raw materials start feeding to, and mixing in, the mixing chamber 14 (The master controller 78, pre-filter main-line pressure sensor 130 and mixing-chamber feed-line flow sensor 102 are typically always in an active state.). The master controller 78 will not allow such actuation unless both minimums are met. Once the feed pumps 74 and injection valves 96 are actuated, the master controller 78, for safety reasons and preferably, will automatically shut down the feed pumps 74 and injection valves 96 when either of the values seen at the pre-filter main-line pressure sensor 130 and the mixing-chamber feed-line flow sensor 102 falls below its respective minimum, and automatically restart the feed pumps 74 and injection valves 96 when both of the values seen at the pre-filter main-line pressure sensor 130 and the mixing-chamber feed-line flow sensor 102 meet or exceed its respective minimum. In other words, once the flow of untreated irrigation water 110 to the fields begins, it starts flowing (a) through the pre-filter main line 18, (b) to and through the sand-media filters 16, (c) discharging to, and flowing through the post-filter main line 20, and (d) from there to the irrigation lines in the field(s) (not shown), the master controller 78 will actuate the feed pumps 74 and injection valves 96 if the irrigation water is at the normal or expected pressure, flow and flow rate. Note that generally the flow of irrigation will occur as described above regardless of whether the master controller 78 has actuated the feed pumps 74 and injection valves 96 or has shut down the feed pumps 74 and injection valves 96 after initial actuation because that flow sequence and infrastructure are the conventional elements of the irrigation system.

Based on the nutrient-application profile (the type and amount of nutrients that are required for a given time period of the given crop cycle), the master controller 78 automatically determines and sets the correct synchronizations of the feed pumps 74 to provide the desired feedstock raw materials.

As mentioned elsewhere herein, the master controller 78 controls the temperature within the mixing chamber 14, preventing the temperature from straying out of (normally exceeding) the desired range, by shutting off the feed pumps 74 until that temperature drops to, and can be maintained within, the desired range.

When filter(s) are disposed within the path of the irrigation water flowing through the system of the present invention (which is standard but not universal for commercial irrigation systems), such as the sand-media filters 16 shown within the path of the irrigation water between the pre-filter main line 18 and post-filter main line 20 (except the small stream of irrigation water that is routed through the mixing chamber 14), there is normally a small but significant water-flow pressure drop across the filters, such as sand-media filters 16. A flow rate of at least 20 gallons per minute or more of untreated irrigation water 110 through the mixing chamber 14 is preferred, and the optional booster pump 98 is preferably included to provide such flow rate if the pressure drop across the sand-media filters 16 would result in a lower flow rate through the mixing chamber 14 or if a higher flow rate is required to maintain a mixing chamber temperature below 40 degrees C.

As noted elsewhere, disposed along the mixing-chamber feed line 70 are the booster pump 98, the mixing-chamber feed-line flow meter 100, the mixing-chamber feed-line flow sensor 102 and the mixing-chamber feed-line shut-off valve 104. The mixing-chamber feed-line flow meter 100 determines the actual flow rate of untreated irrigation water 110 to, and therefore through, the mixing chamber 14. The mixing-chamber feed-line flow sensor 102 determines if a flow of untreated irrigation water 110 is occurring to, and therefore through, the mixing chamber 14. The flow of raw material(s) to the mixing chamber 14 will not be permitted unless a flow of untreated irrigation water 110 is occurring through the mixing chamber 14. There of course are electrical connections (not shown) between the mixing-chamber feed-line flow meter 100 and the master controller 78, and between the mixing-chamber feed-line flow sensor 102 and the master controller 78.

The mixing-chamber feed-line shut-off valve 104 is not generally an active element in the operation of the present system, but instead it is an optional, and typically manual, expedient. The mixing-chamber feed-line shut-off valve 104 and the mixing-chamber discharge-line shut-off valve 108 (which likewise is an optional, and typically manual, expedient) can be conveniently used together to isolate the mixing chamber 14 from the flows of irrigation water for maintenance or repair purposes, if ever needed. When the mixing-chamber feed-line shut-off valve 104 and the mixing-chamber discharge-line shut-off valve 108 are open (or in embodiments when they are not present), the small stream of untreated irrigation water 110 flows through the mixing chamber 14 whenever the irrigation water is flowing to the fields (not shown), regardless of whether or not any raw materials are being fed to the mixing chamber 14.

Along the mixing-chamber discharge line 71, downstream of the mixing chamber 14, are the mixing-chamber discharge-line thermocouple 106 which senses the temperature of the phosphorus-nutrient feedstock and irrigation water mixture as it exits the mixing chamber 14, and sends that data signal (temperature reading) to the master controller 78 for its processing and control of the temperature within the mixing chamber 14 as discussed elsewhere herein. There of course are electrical connections (not shown) between the mixing-chamber discharge-line thermocouple 106 and the master controller 78.

The dispositions and functions of the post-filter main-line pressure gauge 126, pre-filter main-line pressure gauge 130 and the post-filter main-line flow sensor 128 are discussed elsewhere.

The sand-media filters 16 are typically large, for instance 300 gallon, stainless steel filters. Such type of filters is routinely used by growers to remove debris from untreated irrigation water before it enters the irrigation system in the fields. The sand-media filters 16 of the system 10 of the present invention generally and preferably would be filters that are already in place at the given irrigation-system site. As the untreated irrigation water 110 passes through the sand of the sand-media filters 16, the flow of the untreated irrigation water 110 is restricted and that flow restriction causes a small but significant pressure drop across the sand-media filters 16. Such pressure drop is typically in the range of from 5 to 15 psi (but can be higher as debris builds up in the filter), and is the reason that there is a pressure differential between the pre-filter main line 18 and the post-filter main line 20. This pressure drop facilitates a large (fast) flow of untreated irrigation water 110 through the mixing chamber 14 that is needed to temper or mitigate the temperature increase stemming from the exotherms within the mixing chamber 14. (As mentioned elsewhere, if the temperature of the water flowing out the mixing chamber 14 is too high, the charging of phosphorus-nutrient feedstock to the mixing chamber 14 is halted.) The previously-described optional booster pump 98 is available to create and/or maintain the requisite water flow through the mixing chamber 14, and it is a highly recommended option for irrigation systems that do not have a large enough pressure drop across the filters 16 to provide the requisite cooling by the untreated irrigation water 110 when the phosphorus-nutrient feedstock is charged to the mixing chamber 14.

In other words, the flow of untreated irrigation water 110 water through the mixing chamber 14 is large (fast) compared to the feed rate (injection rate) of the raw materials into the mixing chamber 14, and thereby quenches any exotherm(s) caused by the charging of phosphorus-nutrient feedstock to the mixing chamber 14.

The level of phosphorus-nutrient feedstock that can be charged to the mixing chamber 14 depends on the size of the mixing chamber 14. For any given level, the mixing chamber 14 and the stream of water flowing through it must be sufficiently large to dampen and mitigate the exotherms generated.

In contrast, the system shown in FIG. 4 and described below charges the phosphorus-nutrient feedstock directly into the irrigation main line, and therefore it intrinsically has a sufficient water flow to dampen and mitigate exotherms generated regardless of the level of phosphorus-nutrient feedstock charged.

Master controller 78 includes various electronic components that are designed to monitor various electrical signals from the sensing devices. Depending on what signals are input, the master controller 78 turns on the various components of the system once the irrigation system is fully operational and in a mode to insure the proper feed of all the raw materials in the correct proportions, under controlled conditions, to safely produce the phosphorus-nutrient feedstock inside the irrigation system. Numerous configurations of electric components could be designed to achieve this control. As shown, the master controller 78 consists of various relays, timing devices and power supplies that take the various signals from the sensing equipment and turn on and off the various control systems to safely control the chemical feed pumps 74. (A master controller could of course send the sensing and control data, via wireless communication networks, to an operator stationed in a distant office.) If any incorrect or out-of-range signal is received by the master controller 78 the circuitry inside the master controller 78 responds and sends the appropriate feedback signal to the appropriate device or system to immediately correct the out-of-range condition, change the flow rate of the raw material feed pumps 74 or totally shut off the raw material feed pumps 74.

The system 10 preferably determines and adjusts the pH of the treated irrigation water 111, particularly as illustrated in FIG. 2 and FIG. 3 in which the lower chamber 82 as shown also houses a pH monitoring system 83 \which, as shown, is comprised of a pH monitoring-system pump 84, a pH sensor 86, a pH feed line 88 and a pH return line 90, and in which the upper chamber 92 includes a pH controller 80. Also along the post-filter main line 20, in the order of from upstream (closest to the mixing-chamber discharge line 71) to downstream (farthest from the mixing-chamber discharge line 71), are the terminal end 116 of the pH return line 90, the starting end 120 of the pH feed line 88 (along which is a pH line shut-off valve 122 and a solenoid 124). The pH control additives, for instance an acid such as sulfuric acid or phosphoric acid (possibly also phosphoric acid to raise pH) are preferably stored as concentrated solutions in a storage container(s) served by a feed pump(s) and a feed line(s) as discussed above and illustrated for the raw materials.

When this optional feature is present, the pH controller 80, which is in electrical connection (not shown) with the flow controller 76, might override the flow controller 76 at times for the specific control of the feed pump(s) (such as one of the feed pumps 74 shown) along the feed line (such as one of the feed lines 40 shown) of the one or more separate pH-control additives) tank (such as one of the tanks 22 shown) to give the target pH. (The construction and operation of these electrical connections are well within the skill of an ordinary person skilled in the art.)

The pH controller 80 is electrically connected (not shown) to the pH monitoring system 83. (The construction and operation of these electrical connections are well within the skill of an ordinary person skilled in the art.) The pH controller 80 in conjunction with the pH monitoring system 83 controls the pH of the treated irrigation water 111 as it leaves the system 10. The pH of the treated irrigation water 111 is monitored by diverting a very small stream of treated irrigation water 111 through the starting end 120 of the pH feed line 88 (see FIG. 3) to the pH sensor 86 (see FIG. 2) whereat the pH of that small stream is determined. Based on the pH of the treated irrigation water 111 and based on the feed being produced in the mixing chamber 14, the pH controller 80 adjusts (increases or decreases) the feed of one or more pH adjustment additives to achieve a target treated irrigation water pH. (Under the present invention, a base is optionally available for increasing the pH if needed to achieve a constant target pH, although in practice a pH increase would normally not be required because the low charge of phosphoric acid is offset by the typical alkalinity of the untreated irrigation water.)

The target treated irrigation water pH is typically a pH of about 6.5, or between 6.5 and 7, and usually is lower than the pH of the untreated irrigation water because, again, untreated irrigation water is usually alkaline.

The solenoid 124 allows the small stream of the treated irrigation water 111 to be diverted to the pH monitoring system 83 via the pH feed line 88. The master controller 78 will normally and preferably activate the solenoid 124 when it actuates the feed pumps 74 and injection valves 96. The electrical connections between the solenoid 124 and the master controller 78 are not shown.

As mentioned above, a small stream of treated irrigation water 111 is diverted from the post-filter main line 20 to the pH monitoring system 83 through the pH feed line 88 and is returned to the post-filter main line 20 (preferably, as shown, upstream of its diversion point) through the pH return line 90. Along the starting end 120 of the pH feed line 88 is a pH feed-line shut-off valve 122. Along the terminal end 120 of the pH return line 90 is a pH return-line shut-off valve 123. The pH feed-line shut-off valve 122 and the pH return-line shut-off valve 123 are not normally active elements of the system 10 but instead are optional, and typically manual, expedients which can be conveniently used together to isolate the pH monitoring system 83 from the flows of irrigation water for maintenance or repair purposes, if ever needed, without discontinuing the irrigation water flow through the remainder of the system 10.

The small stream of treated irrigation water 111 that is diverted from the post-filter main line 20 at the starting end 120 of the pH feed line 88 feeds into the pH monitoring system 83 through the pH feed line 88. (The starting end 120 of the pH feed line 88 as seen in FIG. 3 and the pH feed line 88 as seen in FIG. 2 are opposite ends of a single flow line.) The pH of that small stream is read by the pH sensor 86 of the pH monitoring system 83. Electrical connections between the pH sensor 86 and the pH monitoring system 83 exist but are not shown. The pH monitoring-system pump 84 pumps the small stream through the pH monitoring system 83, and the pH monitoring-system pump 84 is controlled by the master controller 78 (electrical connections between these elements are not shown.)

To summarize, the pH monitoring system 83 includes the pH monitoring-system pump 84 which pumps treated irrigation water 111 from the post-filter main line 20 through the pH feed line 88, past the pH sensor 86, and then back to the post-filter main line 20 through the pH return line 90. The electrical connections between the pH monitoring system 83 and the pH controller 80 are not shown.

The solenoid 124 shuts off treated irrigation water 111 flow from the post-filter main line 20 through the starting end 120 of the pH feed line 88 when the water-flow pressure seen at the pre-filter main-line pressure sensor 130 and/or at the mixing-chamber feed-line flow sensor 102 drop below predetermined threshold values. The solenoid 124 is in electrical connection (not shown) with the master controller 78.

Figure 4:
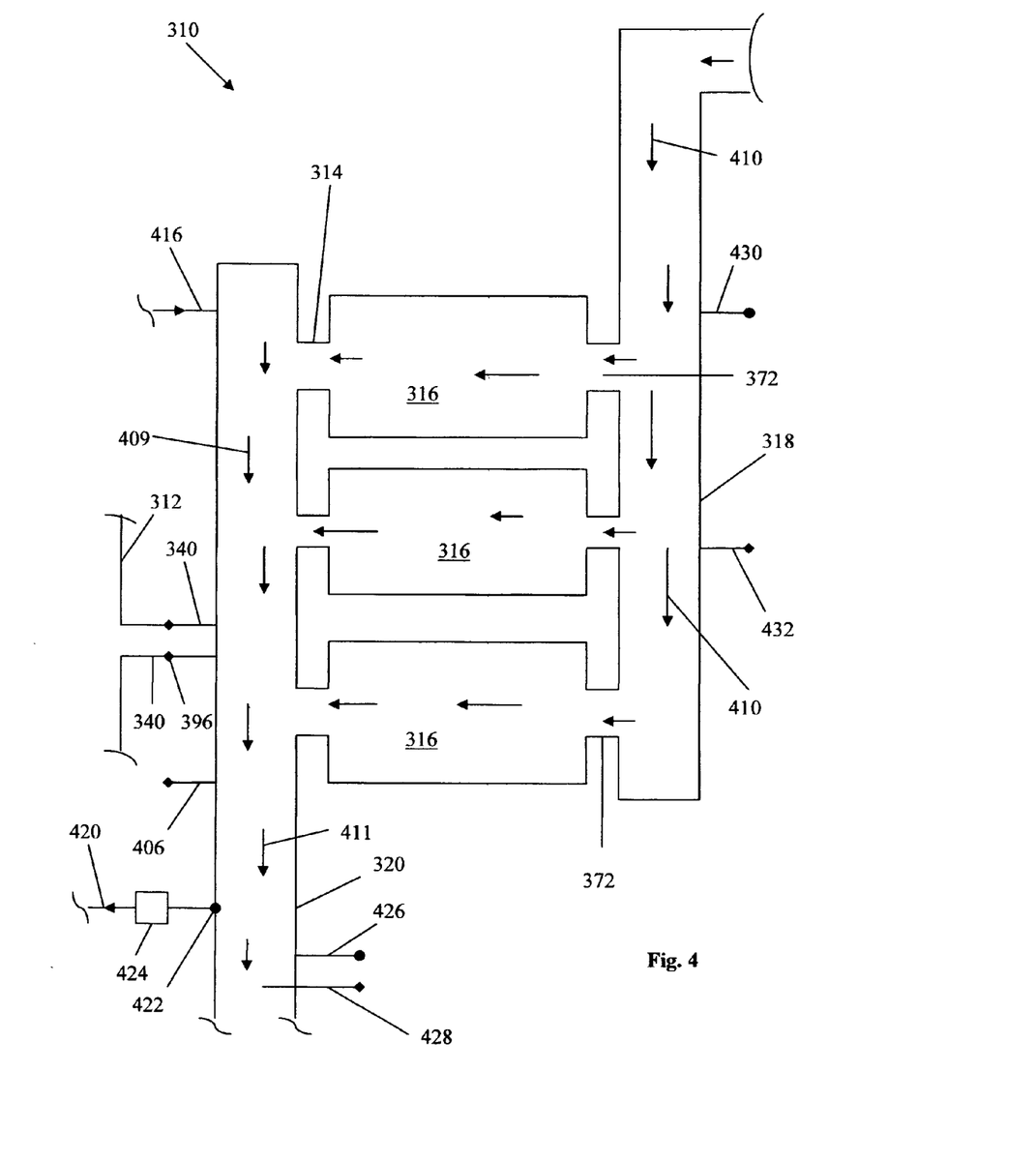
FIG. 4 is an at least partially diagrammatic view of a section of a system of the present invention.

The System of FIG. 4

Referring to FIG. 4, there is shown a segment of a system of the present invention designated by the general reference numeral 310, which differs from the system 10 of FIG. 1 to FIG. 3 by the omission of a separate mixing chamber component such as the mixing chamber 14 of the embodiment shown in FIG. 1 to FIG. 3. In the system 310 of FIG. 4, the raw material feed lines 340 (here, only two) feed directly into a main line (as shown, into the main line segment that is the post-filter main line 320.

The system 310 includes a control unit 312 (partially shown in FIG. 4), a plurality of filters 316, an irrigation-water line or main line (which is designated in two segments, namely a pre-filter main line 318 and a post-filter main line 320) and filters 316 along the main line between its pre-filter segment (pre-filter main line 318) and its post-filter segment (post-filter main line 320). Components of system 310 that are not shown in FIG. 4 include the components within the control unit 312, namely a lower chamber which houses a feed-line feed pump, pH monitoring-system pump, a pH sensor, a pH feed line and a pH return line, and also an upper chamber which houses a flow controller, a master controller, a pH controller and a temperature controller. Other components of system 310 that are not shown in FIG. 4 include at least two storage containers (one for each of two raw materials, although this system 310 could just as well have just one for the phosphoric acid, or instead one or more additional storage containers to hold other raw materials or other materials as discussed above for system 10 of FIG. 1 through FIG. 3). In each instance the components of system 310 that are not shown in FIG. 4, and their electrical connections, are analogous to those described above for the system 10 shown in FIG. 1 to FIG. 3, and therefore no further description is needed here. Further, the components of system 310 that are shown in FIG. 4, and their electrical connections, also are analogous to those described above for the system 10 shown in FIG. 1 to FIG. 3, except as explicitly stated otherwise herein, and therefore little or no further description is needed here.

As mentioned above, there is a raw-material feed line 340 between each of the two raw-material tanks (not shown) and the post-filter main line 320. These raw-material feed lines 340 run through the interior of the control unit 312 and, as seen in FIG. 4, from there to the post-filter main line 320. For each of the raw materials, and raw-material feed lines 340, which for system 310 is two raw materials and two raw-material feed lines 340, there is an injection valve 396 along the raw-material feed line 340 just ahead of the point at which the feed line 340 enters, or discharges to, the post-filter main line 320.

Irrigation water flows to and through each of the filters 316 through filter feed lines 372, and discharges from each of the filters 316 to the post-filter main line 320. The raw materials also discharge to the post-filter main line 320 (via the feed lines 340) and along each of the raw material feed lines 340 upstream of the post-filter main line 320 is, as mentioned above, an injection valve 396, each of which is equipped with a backflow preventer (not shown).

In system 310, unlike the system 10 shown in FIG. 1 to FIG. 3, not only is there no separate mixing chamber component, there is no mixing-chamber feed line, no optional booster pump, no mixing-chamber feed-line flow meter, no mixing-chamber feed-line flow sensor, no mixing-chamber feed-line shut-off valve, no mixing-chamber discharge line and no mixing chamber discharge-line shut-off valve. There is a component that is the functional equivalent of the mixing-chamber discharge-line thermocouple 106, and that is a post-filter main-line thermocouple 406 that is positioned along the post-filter main line 320 downstream of the points at which the feed lines 340 discharge to the post-filter main line 320. The post-filter main-line thermocouple 406 ("thermocouple 406"), like the mixing-chamber discharge-line thermocouple 106 of system 10, tracks the exotherm by monitoring the irrigation-water temperature in the water stream to which the feedstock is charged.

The pre-filter segment of the main line (pre-filter main line 318) is open to each of the filters 316 through filter feed lines 372 or openings. Untreated irrigation water, that is, irrigation water that is not yet treated by the system of the present invention, which is shown by flow arrows and is designated as untreated irrigation water 410 in FIG. 4, flows through the pre-filter main line 318 and discharges to the filters 316 through the respective filter feed lines 372. In addition, each of the filters 316 is open to, and discharges to, the post-filter main line 320 via filter discharge lines 314 or openings. The untreated irrigation water 410 thus flows through the filters 316 and thereafter receives the charge of raw material(s) from their feed line(s) 340, becoming treated irrigation water that carries or has been treated with the feedstock of the present invention. Although charging the feedstock along a post-filter section of the main line (post-filter main line 320) is preferred, charging the feedstock along a pre-filter section of the main line (pre-filter main line 318) is not excluded from the present invention. The feedstock charge should, however, be pre-delivery (upstream of the point(s) of delivering the irrigation water to the crop). Such irrigation water is shown by flow arrows and is designated as treated irrigation water 411 in FIG. 4 and elsewhere herein.

Along the post-filter main line 320, in the order of from upstream (where the stream of irrigation water has not flowed past the feed lines 340 and therefore the water is filtered but not yet irrigation water 409) to downstream (farthest along the post-filter main line 320), are a post-filter main-line pressure gauge 426 and a post-filter main-line flow sensor 428.

Along the pre-filter main line 318, in the order of from upstream (closest to the water source, not shown) to downstream, are a pre-filter main-line pressure sensor 430 and a pre-filter main-line pressure gauge 432.

The temperature controller (not shown) within the control unit 312 is in electrical connection (not shown) with the thermocouple 406 along the post-filter main line 320. (The construction and operation of these electrical connections are well within the skill of an ordinary person skilled in the art.) The raw materials from the various storage tanks (not shown) are routed through the respective raw material feed lines 340 and charged to the post-filter main line 320 as the phosphorus-nutrient feedstock of the present invention. The component(s) of the phosphorus-nutrient feedstock intermix with each other and/or the relatively large stream of filtered irrigation water 409 flowing out from the filters 316. Upon such intermixing, there is an exotherm from at least the heat of dissolution of the raw material(s). This exotherm is the reason the temperature of the phosphorus-nutrient feedstock and irrigation water mixture is preferably monitored by the thermocouple 406 downstream of the points at which the feed lines 340 discharge the raw materials to the post-filter main line 320. If that temperature is undesirably high, for instance 40° C. or higher (higher than 39° C.), the temperature controller (not shown) sends a feedback signal to the master controller (not shown) and the master controller shuts off the feed pumps (not shown) until a safe temperature is seen at the thermocouple 406, and this off/on sequence is repeated until a safe temperature, as seen at the thermocouple 406, is maintained. The volume and flow of irrigation water 409 in the post-filter main line 320 are, however, far greater than that through the mixing chamber 14 of system 10 shown in FIG. 1 to FIG. 3, and therefore the likelihood of an excessively high temperature being seen at the thermocouple 406 approaches negligible, regardless of the concentration of raw materials which are being fed, outside of, of course, a major water-flow problem in the irrigation system itself.

The master controller (not shown) automatically turns the system 310 on. The master controller is electrically connected (not shown) to the pre-filter main-line pressure sensor 430. (The construction and operation of these electrical connections are well within the skill of an ordinary person skilled in the art.) When a minimum pressure (typically 15 psi) is seen at the pre-filter main-line pressure sensor 430, the master controller actuates the feed pumps (not shown) and injection valves 396 and any other component of the system 310 which facilitate the treatment of the irrigation water that are then in an inactive state. Upon such actuation, raw materials start feeding to the post-filter main line 320 as the phosphorus-nutrient feedstock of the present invention. The master controller will not allow such actuation unless the minimum is met. Once the feed pumps (not shown) and injection valves 396 are actuated, the master controller, for safety reasons and preferably, will automatically shut down the feed pumps and injection valves 396 when the value seen at the pre-filter main-line pressure sensor 430 falls below its minimum, and automatically restart the feed pumps and injection valves 396 when the value seen at the pre-filter main-line pressure sensor 430 meets or exceeds its respective minimum. In other words, once the flow of untreated irrigation water 410 to the fields begins, the irrigation water starts flowing (a) through the pre-filter main line 318, (b) to and through the filters 316, (c) discharging to, and flowing through the post-filter main line 320, and (d) from there to the irrigation lines in the field(s) (not shown), and when this flow starts, the master controller will actuate the feed pumps and injection valves 396 provided this irrigation water flow is at the normal, or expected, pressure, flow and flow rate. Note that generally the flow of irrigation will occur as described above regardless of whether the master controller has actuated the feed pumps and injection valves 396 or has shut down the feed pumps and injection valves 396 after initial actuation because that water flow sequence and infrastructure are the conventional elements of the irrigation system.

The starting end 420 of the pH feed line is downstream of the point(s) at which the raw materials are charged to the post-filter main line 320 and therefore, as in system 10 shown in FIG. 1 to FIG. 3, it is the pH of the treated irrigation water 411, not the irrigation water prior to treatment, which is being monitored by diverting a very small stream of treated irrigation water 411 through the starting end 420 of the pH feed line to the pH sensor (not shown) whereby the pH controller (not shown) adjusts (increases or decreases) the feed of acid(s) (an acid in addition to the phosphoric acid raw material would seldom, if ever, be necessary) and/or base(s) to achieve a constant target treated irrigation water pH. The target treated irrigation water pH is typically a pH of about 6.5. Along the post-filter main line 320, in the order of from upstream (where the stream of irrigation water has not flowed past the feed lines 340 and therefore the water is filtered but not yet irrigation water 409) to downstream (farthest along the post-filter main line 320), are the terminal end 416 of the pH return line, the raw material feed lines 340 and the thermocouple 406 (both mentioned above), the starting end 420 of the pH feed line (along which is a pH line shut-off valve 422 and a solenoid 424), a post-filter main-line pressure gauge 426 and a post-filter main-line flow sensor 428 (both mentioned above).

Again, the remainder of the system 310 is analogous to the system 10 shown in FIG. 1 to FIG. 3 and described in detail above. Further, as described above for system 310, the "mixing chamber" concept is part of, or within, the irrigation main line, namely the post-filter section of the irrigation main line (post-filter main line 320). The dilution of the phosphorus-nutrient feedstock in this far greater water stream is of course highly increased, thereby minimizing the exotherm even more than is possible with a separate mixing chamber component such as the mixing chamber 14 of system 10. Further, system 310 is simpler than system 10 because most of the controls associated with a separate mixing chamber component such as the mixing chamber 14 of system 10 are eliminated, as described above, and even the thermocouple 406 may be an unnecessary safety component because the level of phosphorus-nutrient feedstock being charged is so extremely low in comparison to the volume of irrigation water to which it is being charged.

Example 1 and Comparative Example A

Projections

The method of the present invention in comparison to conventional fertilization practices was evaluated for use at a very large vineyard. The grower conducted plant tissue analyses and soil analyses to determine the fertilization requirements. Based on these analyses, the phosphorus fertilization recommendation to the grower for a single crop cycle was 22 lb/acre as P2O5.

Although 22 lb/acre of phosphorus as P2O5 meets the grower's phosphorus agronomic needs, it clashes with conditions on this ranch when conventional fertigation practices are considered. Phosphorus is derived from phosphate fertilizers. This grower has experienced severe plugging problems in the past when feeding any type of conventional phosphate fertilizer, and therefore phosphate is never added through this grower's micro-irrigation system. Instead it is manually field spread at this vineyard.

Comparative Example A

Details

Field-spread phosphoric acid is used as the phosphorus source. Due to the history of severe phosphate-produced plugging experienced by this grower, which presumably has arisen from an incompatibility between phosphates and the irrigation water, this phosphorus source is field spread by the grower in the amount of 22 lbs./acre of phosphate as P2O5, in two equal applications of 11 lbs/acre phosphorus (as P2O5), namely one at the beginning and another toward the end of the crop cycle, to meet the phosphorus nutrient recommendation using conventional fertigation and fertilization methods.

The irrigation water profiles are as follows. Usage of 1.0 ac-ft/acre from February 1 through September 30. Irrigation water flow rate of 1,000 gal./min. Acreage of 150 acres. Irrigation water pH of 8.0 except during the three days of cleaning with concentrated sulfuric acid. Irrigation duration (as to slug feeding time) of six hours per slug-feed day. For comparative purposes, if the phosphorus was added to the irrigation system in slug feedings of 11.0 lbs/acre phosphorus (as P2O5) over the six-hour irrigation period at the 1,000 gal./min. flow rate on 2/15 and 9/30, each slug feeding would generate a 551 ppm level of P2O5, which is a 738 ppm level of PO4-3 in the irrigation water. This level of the phosphate multivalent anion is well in excess of the level that, in combination with the hardness and alkalinity already present in the irrigation water, causes precipitation and subsequent plugging of the irrigation system.

Example 1

Irrigation Water Profiles

The irrigation water profiles are as follows. Usage of (a) 1.0 ac-ft/acre from February 1 through September 30. Irrigation water flow rate of 1,000 gal./min. Irrigation water pH of 6.5. Irrigation duration (as to per-irrigation-period continuous feeding time) of six hours per irrigation period. As noted above, the acreage being irrigated is 150 acres.

Example 1

Prolonged-Term Continuous-Feeding Projections and Multivalent Ion Levels

The raw materials continuously fed are 11.0 lbs/acre phosphorus (as P2O5) from February 1 through September 30, and ammonium hydroxide and/or potassium hydroxide as needed to maintain a target pH of 6.5. This is a prolonged term of continuous feeding that runs throughout the crop cycle.

The continuous feeding of 11.0 lbs/acre phosphorus (as P2O5) over an eight-month time period (February 1 through September 30), in six-hour irrigation periods at the 1,000 gal./min. flow rates generates at most a 4.1 ppm level of P2O5, which is a 5.4 ppm level of PO4-3 in the irrigation water. This level of the phosphorus multivalent anion is below the levels that, in combination with the hardness and alkalinity already present in the irrigation water, will cause precipitation and subsequent plugging of the irrigation system. In comparison to Comparative Example A, there is a 137 fold reduction of PO4-3 concentration in the irrigation water. This reduction, provided by the method of the present invention, allows phosphate to be successfully added to the irrigation system without disastrous plugging and eliminates the need for field spreading phosphate.

Example 2 and Comparative Example B

Projections

The method of the present invention in comparison to conventional fertilization practices was evaluated for use at a 150 acre almond ranch that has been using conventional fertilization practices for years. For this comparison, a fertigation program similar to that used in the past was selected for the projection of Comparative Example B. The projection of Example 2 is approximately 30 percent lower because, as discussed above, a far higher percentage of the phosphorus nutrient applied are available to the crop in comparison to conventional fertilization practices such as those of Comparative Example B. (The downward adjustment of the phosphorus nutrient profile for the method of the present invention is a very conservative estimate of the lower nutrient levels required when nutrients are no longer being lost to the root area as described above for conventional fertilization.) These projections are phosphorus (as P2O5) of 70 lb/acre for Comparative Example B and 50 lb/acre for Example 2.

The agricultural area of this Example 2 and Comparative Example B, namely the 150 acre almond ranch, will normally receive a total of four acre-feet of irrigation water over its eight-month (March 1 to November 1) growing season (crop cycle), delivered as follows: 1.0 acre-foot during the first three months (March 1 through June 1); 2.5 acre-feet during the second three months (June 1 through September 1); and 0.5 acre-foot during the last two months (September 1 through November 1). An acre-foot is 325,851 gallons, and therefore 195.5 million gallons of irrigation water are delivered to the acreage of this ranch per growing season (crop cycle). The conventional fertigation program or schedule historically required on this almond ranch to meet the phosphorus nutrient profile is shown in Table 1 below. The fertigation program required using the method of the present invention to meet the adjusted phosphorus nutrient profile is shown in Table 2 below.

TABLE 1

Conventional Fertigation Schedule

Amounts Slug Fed (lb./acre)

| | Mar. 1 | Mar. 15 | Mar. 30 | May 15 | July 1 | Sept. 15 | Sept. 30 |
|---|---|---|---|---|---|---|---|
| Fertilizer Solution (% N-P-K & other nutrients) | | | | | | | |
| NH4H2PO4 (10-34-0) Phosphorus Nutrient | | 102.9 | | | | 102.9 | |
| Phosphorus (as P2O5) | | 35.0 | | | | 35.0 | |

TABLE 2

Prolonged-Termed Continuous-Feed Fertigations Schedule

Total Amounts Fed Over Time Periods (lb.)

| | March | April | May | June | July | August | September | October |
|---|---|---|---|---|---|---|---|---|
| Fertilizer Solution (% N-P-K & other nutrients) | | | | | | | | |
| Phosphoric acid (0-54.3-0) Phosphorus Nutrient | ← | 55.24 | | → | | | ← 36.83 → | |
| Phosphorus (as P2O5) | ← | 30.00 | → | | | | ← 20.00 → | |

Comparative Example B and Example 2

Projection Comparisons

Prolonged-Termed Continuous Feed

Example 2

Projection

From March 1 up to, but not including, June 1, the addition of 30.00 lb/acre phosphorus (as P2O5), given a water usage of 1.00 ac-ft/acre, provides a concentration of 14.81 ppm PO4-3 in the irrigation water. From September 1 up to, but not including, November 1, the addition of 20.00 lb/acre phosphorus (as P2O5), given a water usage of 0.50 ac-ft/acre, provides a concentration of 19.75 ppm PO4-3 in the irrigation water.

The maximum amount of calcium that can be present in the irrigation water at a pH of 6.5 is 94.8 ppm calcium (as Ca) when the 14.81 ppm PO4-3 level is being charged, and 78.2 ppm calcium (as Ca) when the 19.75 ppm PO4-3 level is being charged. Exceeding that maximum will, due to calcium/phosphate interaction and/or precipitation, will lead to plugging of the irrigation system. The irrigation water at this site contains 150 ppm calcium (as CaCO3), which is a level of 60 ppm calcium (as Ca), and which is well below these 94.8 ppm calcium (as Ca) and 78.2 ppm calcium (as Ca) calcium-concentration thresholds (above which there is a irrigation-system plugging problem).

As shown above, the phosphorus acid is continuously added over two prolonged terms comprising the first three months and the last two months of the eight-month crop cycle. Although the degree of alleviation of unbalanced nutrient availability would be higher if the continuous charge of phosphorus acid were continued throughout the eight-month crop cycle, significant alleviation benefits are still realized and prolonged terms of less than throughout the entire crop cycle are at times necessitated by, or selected because of, grower preferences, changes in phosphorus-addition target, additions of incompatible additives and the like.

If the growing conditions (and therefore the desired phosphorus nutrient addition) change, the amount of the phosphorus nutrient being charged can be changed to best suit conditions at a moments notice and/or the duration of the prolonged termed continuous fertigation periods can be modified.

Slug Feed—Comparative Example B Projection (Calcium, Phosphorus, Water Quality):

The profile above provides fertigations on March 30 and September 15 that feed 1304 ppm phosphate (as PO4-3). Each of these slug feedings requires nine hour to feed the required amount of P2O5 for the 150 acres. Based on the flow rate of 1200 gallons of irrigation water per hour, the resultant concentration of phosphate (as PO4-3) is 1304 ppm. Because the irrigation water at this site contains 150 ppm calcium (as CaCO3) (60 ppm calcium (as Ca)), the calcium already present in the irrigation water is much higher than the 4.4 ppm calcium (as CaCO3) threshold and if that profile was followed, precipitation and plugging of the irrigation system would occur upon slug feeding phosphate.

Example 3 and Comparative Example C

Projections

The fertigation projections for a ranch having 453 acres of almonds under cultivation were developed using conventional fertigation techniques in Comparative Example C and, for comparison, the method and system of the present invention in Example 3. The expected irrigation period (crop cycle) for the crop is March 1 through October 30. The irrigation system on this ranch does not allow simultaneous irrigation of the entire 453 acres. Instead, the 453 acres are irrigated in five portions or sections, and a set of valves switches the water flow from one section to another. Fertigation of course must likewise be conducted in five portions or sets, that is, one set for each of the five sections. Slug-fed fertigation for a set typically requires feeding the material into the irrigation system for a time period of six to seven hours, and then this is repeated the following day for the next set, until all sections are fertigated in five sets usually over a five-day time period. The prolonged-termed continuous-feed fertigations of Example 3 are each for less than the entire crop cycle and during those terms are of course ongoing whenever the irrigation system is (a) active and (b) at the appropriate water-flow level as described elsewhere.

The phosphorus nutrient profiles and the materials and amounts thereof (80 lb./acre) to be fed for the conventional slug-fed fertigation with commercial fertilizers of Comparative Example C and the present invention's prolonged-termed continuous fertigation of Example 3 are provided below.

Comparative Example C

Conventional Slug-Fed Fertigation with Commercial Fertilizers

Meeting the phosphorus nutrient profile below requires four slug-fed fertigations (each designated by the first date of a series of five fertigation sets) and the addition of a single commercial fertilizer at a single feed point along the irrigation system's main line for each slug-fed fertigation. The number of slug-feeding fertigation sets therefore is twenty. In addition, the total poundage fed to the system is significantly higher than that of Example 3.

Phosphorus (as P2O5) Profile:

80 lbs./acre Total Phosphorus. The phosphorus will be obtained from a variety of commercially available fertilizers: Commercial (7-21-0); Commercial (4-6-10); Commercial (10-34-0); and Commercial (0-21-0). The phosphorus is to be added in the amount of 40 lbs./acre of total phosphorus (as P2O5) in two slug feedings between March 1 and May 31, and an additional 40 lbs./acre of total phosphorus (as P2O5) in two slug feedings between September 1 and October 30.

pH Profile:

No adjustment (pH is the pH of the incoming irrigation water, which is about 7.8, and which might be somewhat modified by the slug-feedings).

Commercial Fertilizers Fed and Nutrients Provided:

March 1 Commercial Fertilizer Fed and Nutrient Provided:

Slug-feed of 142.9 lbs./acre of a blended commercial mixture called Structure® (Structure® is a registered trademark of Actagro, LLC of Biola, Calif.) which is derived from ammonia, urea, ammonium nitrate, phosphoric acid and other non-fertilizer ingredients (7-21-0). This slug-feed provides 30.0 lbs./acre of phosphorus (as P2O5).

May 1 Commercial Fertilizer Fed and Nutrient Provided:

Slug-feed of 167.2 lbs./acre of a blended commercial mixture called Cache® (Cache® is a registered trademark of Actagro, LLC of Biola, Calif.) which is derived from ammonia, urea, ammonium nitrate, phosphoric acid and potassium chloride (4-6-10). This slug-feed provides 10.0 lbs./acre of phosphorus (as P2O5).

September 15 Commercial Fertilizer Fed and Nutrient Provided:

Slug-feed 88.2 lbs./acre of a blended commercial mixture (called liquid ammonium polyphosphate) which is derived from ammonium phosphate (10-34-0). This slug-feed provides 30.0 lbs./acre of phosphorus (as P2O5).

October 1 Commercial Fertilizer Fed and Nutrient Provided:

Slug-feed 47.6 lbs./acre of a blended commercial mixture (called DPG 0-21-0) which is derived from phosphoric acid and other non-fertilizer ingredients (0-21-0). This slug-feed provides 10.0 lbs./acre of phosphorus (as P205).

Example 3

Prolonged-Termed Continuous Fertigation of the Present Invention

The phosphorus-nutrient profile of 80 lbs./acre of total phosphorus (as P205) is satisfied with prolonged-termed continuous feedings of concentrated phosphoric acid during the following prolonged terms: 40 lbs./acre of total phosphorus (as P205) from March 1 through May 31; and 40 lbs./acre of total phosphorus (as P205) from September 1 through October 30.

pH Profile:

Continuously adjust to a pH of 6.5 during the continuous-feed intervals.

Summary and Comments on Comparative Example C, March 1 through June 15

The March 1 slug-fed fertigation used Structure® (Structure® is a registered trademark of Actagro, LLC of Biola, Calif.). Structure® as stated in Comparative Example C is made from the following raw materials; ammonia, ammonium nitrate, urea, and phosphoric acid. When these raw materials are reacted at the commercial fertilizer production plant the following reactions take place to some extent until an equilibrium is reached:

1). $NH_4NO_3$—No reaction
2). $Urea + H_3PO_4 \rightarrow [Urea][H_3PO_4]$ + heat of reaction
3). $NH_3 + H_3PO_4 \rightarrow (NH_4)H_2PO_4$ + heat of reaction
4). $2\ NH_3 + H_3PO_4 \rightarrow (NH_4)_2HPO_4$ + heat of reaction
5). $3\ NH_3 + H_3PO_4 \rightarrow (NH_4)_3PO_4$ + heat of reaction In solution these transient reaction products immediately dissociate into the following ionic and neutral species with the formation of additional heat: (a) the cations $NH_4^+$ and $H^+$; (b) the anions $NO_3^-$, $H_2PO_4^-$, $HPO_4^{-2}$ and $PO_4^{-3}$; and (c) the neutral species urea, and these are the species which ultimately form the basis of the nutrients that the plant uses.

The May 1 slug-fed fertigation used Cache® (Cache® is a registered trademark of Actagro, LLC of Biola, Calif.) which, as stated in Comparative Example C, is made from the following raw materials; ammonia, ammonium nitrate, urea, phosphoric acid and potassium chloride. When these raw materials are reacted at the fertilizer plant the following reactions take place to some extent until an equilibrium is reached:

1). $NH_4NO_3$—No reaction
2). $Urea + H_3PO_4 \rightarrow [Urea][H_3PO_4]$ + heat of reaction
3). $NH_3 + H_3PO_4 \rightarrow (NH_4)H_2PO_4$ + heat of reaction
4). $2\ NH_3 + H_3PO_4 \rightarrow (NH_4)_2HPO_4$ + heat of reaction
5). $3\ NH_3 + H_3PO_4 \rightarrow (NH_4)_3PO_4$ + heat of reaction
6). KCl—No reaction In solution these transient compounds immediately dissociate into the following ionic and neutral species with the formation of additional heat: (a) the cations $NH_4^+$, $H^+$ and $K^+$; (b) the anions $HPO_4^{-2}$, $H_2PO_4^-$, $PO_4^{-3}$ and $Cl^-$; and (c) neutral urea, and these are the species which ultimately form the basis of the nutrients that the plant uses, except for chloride. The chloride anion is not a fertilizer nor any kind of nutrient. It is actually toxic for many crops.

Summary and Comments on Example 3, March 1 through June 15

The method and system of the present invention uses phosphoric acid as the concentrated raw material to form in aqueous solution the anions $H_2PO_4^-$, $HPO_4^{-2}$ and $PO_4^{-3}$; and these are the species which ultimately form the basis of the nutrients that the plant uses.

The continuous fertigations use the same raw material (concentrated phosphoric acid) and concentration throughout the time period or, if the growing conditions changed, the amounts of the nutrients being charged can be changed to best suit conditions at a moment's notice.

The present invention in certain embodiments is a system for continuous fertigation of an agricultural field under the irrigation of an active agricultural irrigation system, wherein the fertigation includes continuously charging a phosphorus-nutrient feedstock to the active agricultural irrigation system for a prolonged term. The active agricultural irrigation system has flowing irrigation water upstream of the agricultural field. The phosphorus-nutrient feedstock is comprised of x phosphorus-nutrient-feedstock raw materials (phosphoric acid, and at times a base selected from the group consisting of urea, potassium hydroxide, ammonium hydroxide, ammonia and combinations thereof), wherein x is an integer between 1 and 5. The phosphorus-nutrient-feedstock raw materials generate an exotherm upon intermixing with each other when x is greater than 1 and upon intermixing with irrigation water. The system comprises x feed points open to a stream of the flowing irrigation water, wherein x is an integer between 1 and 5, means for feeding the phosphorus-nutrient-feedstock raw materials simultaneously and separately through the feed points to the stream of the flowing irrigation water whereby treated irrigation water is formed, and means for irrigating the agricultural field with the treated irrigation water wherein the stream of the flowing irrigation water has sufficient flow to intermix the phosphorus-nutrient-feedstock raw materials with each other when x is greater than 1 and with the stream of the flowing irrigation water, generating an exotherm, when the phosphorus-nutrient-feedstock raw materials are simultaneously and separately fed through the feed points, and wherein the stream of the irrigation water has sufficient flow to dampen the exotherm.

In preferred embodiments, the phosphorus-nutrient raw-material feed points open to a high-dilution environment, the active agricultural irrigation system includes a main line and the feed points are disposed along the main line, the active agricultural irrigation system includes a main line and a side-arm mixing chamber off the main line, and the feed points are disposed along the side-arm mixing chamber. In other preferred embodiments of the system of the present invention, the system includes means to commence the feed upon the stream reaching a first pre-selected degree of flow, means to halt the feed upon the stream reaching a second pre-selected degree of flow, means to separately provide pre-selected degrees of feed through the feed points, means to determine and adjust the pH of the treated irrigation water upstream of the agricultural field, x storage tanks and x feed lines, wherein x is an integer between 1 and 5, each feed line separately running between a storage tank and a feed point, particularly when the feed points are spaced apart a maximum of ten inches.

The present invention is also a method of prolonged-termed continuous fertigation of an agricultural field, the agricultural field being irrigated over a crop cycle by means of an active irrigation system having flowing irrigation water upstream of the agricultural field. The method comprises the steps of: (step 1) converting the irrigation water to treated irrigation water by continuously charging a phosphorus-nutrient feedstock to a stream of the flowing irrigation water upstream of the agricultural field simultaneously and separately through a the plurality of feed points over a prolonged term of from multiple consecutive irrigations to throughout the crop cycle and (step 2) irrigating the agricultural field with the treated irrigation water, wherein the phosphorus-nutrient feedstock is comprised of a 50 to 85 wt. percent aqueous solution of phosphoric acid, wherein the stream of flowing irrigation water has sufficient flow to intermix the phosphorus-nutrient feedstock with the irrigation water, generating an exotherm, and wherein the stream of flowing irrigation water has sufficient flow to dampen the exotherm. The present invention is also a method of prolonged-termed continuous fertigation of an agricultural field by prolonged-termed continuous charge of a phosphorus-nutrient feedstock to the active agricultural irrigation system using the fertigation system of the present invention.

In certain preferred embodiments, the feedstock is charged at a level sufficient to provide a concentration of from 1 to 100 ppm of phosphate as PO4-3 in said irrigation water (whereby said irrigation water is converted to treated irrigation water), the flow of the stream of flowing irrigation water is sufficient to dampen the dissolution and reaction exotherms to a maximum temperature increase of 40 degrees F. over ambient irrigation water temperature, and the phosphorus-nutrient feedstock is comprised of a 65 to 85 wt. percent aqueous solution of phosphoric acid and a base selected from the group consisting of concentrated urea, concentrated potassium hydroxide, concentrated ammonium hydroxide, ammonia and combinations thereof. In other preferred embodiments, the prolonged term is from one month to throughout the crop cycle, the continuous charge of the phosphorus-nutrient feedstock is a continuous charge to the mainline, the continuous charge the phosphorus-nutrient feedstock to the stream of flowing irrigation water is a continuous charge to the side-arm mixing chamber, the pH of the treated irrigation water upstream of the agricultural field is adjusted when needed, the phosphorus-nutrient feedstock is comprised of phosphorus-nutrient-feedstock raw materials comprised of a 65 to 85 wt. percent aqueous solution of phosphoric acid and a base selected from the group consisting of concentrated urea, concentrated potassium hydroxide, concentrated ammonium hydroxide, ammonia and combinations thereof, and, in step 1, each of the phosphorus-nutrient-feedstock raw material is charged through separate feed points, the stream of flowing irrigation water is sufficient to dampen the dissolution and reaction exotherms to a maximum temperature increase of 20 degrees F. over ambient irrigation water temperature, the feed points are spaced apart a maximum of ten inches and the phosphoric acid is charged to the stream of flowing irrigation water at a level sufficiently low to provide a concentration of phosphate in the treated irrigation water below the phosphate solubility ceiling.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A system for continuous fertigation of an agricultural field under the irrigation of an active agricultural irrigation system, wherein said system includes continuously charging a phosphorus-nutrient feedstock to said active agricultural irrigation system for a prolonged term, said active agricultural irrigation system having flowing irrigation water upstream of said agricultural field, wherein said phosphorus-nutrient feedstock is comprised of x phosphorus-nutrient-feedstock raw materials, wherein x is an integer between 1 and 5, wherein said phosphorus-nutrient-feedstock raw materials generates an exotherm upon said charging, said system comprising:

x phosphorus-nutrient raw-material feed points, wherein x is an integer between 1 and 5, open to a stream of said flowing irrigation water;

means for feeding said phosphorus-nutrient-feedstock raw materials simultaneously and separately through said feed points to said stream of said flowing irrigation water whereby treated irrigation water is formed, and means for irrigating said agricultural field with said treated irrigation water.

2. The system for continuous fertigation of an agricultural field according to claim 1 wherein said phosphorus-nutrient raw-material feed points open to a high-dilution environment.

3. The system for continuous fertigation of an agricultural field according to claim 1 wherein said active agricultural irrigation system includes a main line, said stream of said flowing irrigation water is flowing through said main line upstream of said agricultural field, and said phosphorus-nutrient raw-material feed points are disposed along said main line.

4. The system for continuous fertigation of an agricultural field according to claim 1 wherein said active agricultural irrigation system includes a main line and a side-arm mixing chamber off said main line, and said stream of said irrigation water is flowing through said side-arm mixing chamber and discharging to said main line, and said phosphorus-nutrient raw-material feed points are disposed along said side-arm mixing chamber.

5. The system for continuous fertigation of an agricultural field according to claim 1 further including means to regulate the feed of said phosphorus-nutrient-feedstock raw materials being fed to said stream of said flowing irrigation water through said phosphorus-nutrient raw-material feed points, including means to commence said feed upon said stream reaching a first pre-selected degree of flow, means to halt said feed upon said stream reaching a second pre-selected degree of flow, and means to separately provide pre-selected degrees of feed through said feed points.

6. The system for continuous fertigation of an agricultural field according to claim 1 wherein said active agricultural irrigation system further including means to determine and adjust the pH of said treated irrigation water upstream of said agricultural field.

7. The system for continuous fertigation of an agricultural field according to claim 1 further including x storage tanks and x feed lines, wherein x is an integer between 1 and 5, each feed line separately running between a storage tank and a feed point of said phosphorus-nutrient raw-material feed points.

8. The system for continuous fertigation of an agricultural field according to claim 7 wherein said feed points are spaced apart a maximum of ten inches.

9. A method of prolonged-termed continuous fertigation of an agricultural field, said agricultural field being irrigated over a crop cycle by means of an active irrigation system having flowing irrigation water upstream of said agricultural field, said method comprising the steps of:

(step 1) converting said irrigation water to treated irrigation water by continuously charging a phosphorus-nutrient feedstock to a stream of said flowing irrigation water upstream of said agricultural field simultaneously and separately through a said plurality of feed points over a prolonged term of from multiple consecutive irrigations to throughout said crop cycle;

wherein said phosphorus-nutrient feedstock is comprised of a 50 to 85 wt. percent aqueous solution of phosphoric acid, wherein said stream of flowing irrigation water has sufficient flow to intermix said phosphorus-nutrient feedstock with said irrigation water, generating an exotherm, wherein said stream of flowing irrigation water has sufficient flow to dampen said exotherm, and (step 2) irrigating said agricultural field with said treated irrigation water.

10. The method of pro-longed termed continuous fertigation of an agricultural field according to claim 9 wherein said flow of said stream of flowing irrigation water is sufficient to dampen said dissolution and reaction exotherms to a maximum temperature increase of 40 degrees F. over ambient irrigation water temperature.

11. The method of continuous fertigation of an agricultural field according to claim 9 wherein said phosphorus-nutrient feedstock is comprised of a 65 to 85 wt. percent aqueous solution of phosphoric acid and a base selected from the group consisting of concentrated urea, concentrated potassium hydroxide, concentrated ammonium hydroxide, ammonia and combinations thereof.

12. A method of prolonged-termed continuous fertigation of an agricultural field under the irrigation of an active irrigation system having flowing irrigation water upstream of said agricultural field, by prolonged-termed continuous charge of a phosphorus-nutrient feedstock to said active agricultural irrigation system using the fertigation system according to claim 1, said active agricultural irrigation system having flowing irrigation water upstream of said agricultural field, said fertigation system having x feed points open to a stream of said flowing irrigation water upstream of said agricultural field, wherein x is an integer of between 1 and 5, means for charge said phosphorus-nutrient-feedstock raw materials simultaneously and separately through said feed points to said stream of said flowing irrigation water whereby treated irrigation water is formed, and means for irrigating said agricultural field with said treated irrigation water, said method comprising the steps of:

(step 1) converting said irrigation water to treated irrigation water by continuously charging said phosphorus-nutrient feedstock from said feed points to said stream of said flowing irrigation water at a level sufficient to provide a concentration of from 1 to 100 ppm of phosphate as PO4-3 in said irrigation water, whereby said irrigation water is converted to treated irrigation water, over a prolonged term of from multiple consecutive irrigations to throughout a crop cycle;

wherein said phosphorus-nutrient feedstock is comprised of a 50 to 85 wt. percent aqueous solution of phosphoric acid, wherein said stream of flowing irrigation water has sufficient flow to intermix said phosphorus-nutrient feedstock with said irrigation water, generating an exotherm, wherein said stream of flowing irrigation water has sufficient flow to dampen said exotherm, and (step 2) irrigating said agricultural field with said treated irrigation water.

13. The method of continuous fertigation of an agricultural field according to claim 12 wherein said prolonged term is from one month to throughout said crop cycle.

14. The method of continuous fertigation of an agricultural field according to claim 13 wherein said active agricultural irrigation system includes a main line, said stream of said flowing irrigation water is flowing through said main line upstream of said agricultural field, said feed points are disposed along said main line, and wherein, in said step 1, said continuous charge of said phosphorus-nutrient feedstock is a continuous charge to said mainline.

15. The method of continuous fertigation of an agricultural field according to claim 13 wherein said active agricultural irrigation system includes a main line and a side-arm mixing chamber off said main line, and said stream of flowing irrigation water is flowing through said side-arm mixing chamber and discharging to said main line, said plurality of feed points are disposed along said side-arm mixing chamber, and wherein, in said step 1, said continuous charge of said phosphorus-nutrient feedstock to said stream of flowing irrigation water is a continuous charge to said side-arm mixing chamber.

16. The method of continuous fertigation of an agricultural field according to claim 13 further including the steps of determining and adjusting the pH of said treated irrigation water upstream of said agricultural field.

17. The method of continuous fertigation of an agricultural field according to claim 13, wherein said phosphorus-nutrient feedstock is comprised of phosphorus-nutrient-feedstock raw materials comprised of a 65 to 85 wt. percent aqueous solution of phosphoric acid and a base selected from the group consisting of concentrated urea, concentrated potassium hydroxide, concentrated ammonium hydroxide, ammonia and combinations thereof, and, in step 1, each of said phosphorus-nutrient-feedstock raw material is charged through separate feed points.

18. The method of continuous fertigation of an agricultural field according to claim 13 wherein said flow of said stream of flowing irrigation water is sufficient to dampen said dissolution and reaction exotherms to a maximum temperature increase of 40 degrees F. over ambient irrigation water temperature.

19. The method of continuous fertigation of an agricultural field according to claim 13 wherein said flow of said stream of flowing irrigation water is sufficient to dampen said dissolution and reaction exotherms to a maximum temperature increase of 20 degrees F. over ambient irrigation water temperature.

20. The method of continuous fertigation of an agricultural field according to claim 13 wherein said feed points are spaced apart a maximum of ten inches.

21. The method of continuous fertigation of an agricultural field according to claim 13, wherein, in step 1, said phosphoric acid is charged to said stream of flowing irrigation water at a level sufficiently low to provide a concentration of phosphate in said treated irrigation water below the phosphate solubility ceiling.

* * * * *